United States Patent [19]

De La Fuente

[11] Patent Number: 4,995,583

[45] Date of Patent: Feb. 26, 1991

[54] DEVICES FOR DAMPING THE VIBRATIONS OF STAY CABLES

[75] Inventor: Carlos De La Fuente, Nanterre, France

[73] Assignee: Freyssinet International (STUP), Boulogne, France

[21] Appl. No.: 351,226

[22] Filed: May 15, 1989

[30] Foreign Application Priority Data

May 16, 1988 [FR] France .............................. 88 06537

[51] Int. Cl.⁵ .............................................. F16L 3/00
[52] U.S. Cl. .................................... 248/636; 248/74.4
[58] Field of Search .................... 248/636, 562, 49, 65, 248/74.4, 74.1, 500; 188/297, 298; 267/140.1

[56] References Cited

U.S. PATENT DOCUMENTS 3,133,147  5/1964  Auld, Jr. .......................... 248/74.1 X
4,011,397  3/1977  Bouche .......................... 248/74.1 X
4,739,979  4/1986  Kanda ............................. 248/562 X

FOREIGN PATENT DOCUMENTS 664430  2/1988  Czechoslovakia ................. 248/74.1

Primary Examiner—Alvin C. Chin-Shue
Attorney, Agent, or Firm—Fleit, Jacobson, Cohn, Price, Holman & Stern

[57] ABSTRACT

A device is provided for damping the vibrations of a stay cable (1) comprising an annular gutter (6) surrounding a section of the cable and secured to this cable, an annulus (8) mounted in the gutter, with interpositioning of an annular cavity (7), so as to be able to move transversely with respect to this gutter, substantially indeformable seals (10) providing sealing of the annular cavity with respect to the outside, a cushion (9) made from a material capable of flowing without modifying its overall volume and filling the annular cavity, and a rigid structure (11) connecting the annulus to an appropriate foundation (12).

5 Claims, 3 Drawing Sheets

DEVICES FOR DAMPING THE VIBRATIONS OF STAY CABLES

The invention relates to devices for damping the vibrations of stay cables and in particular those of stay cables which equip bridges.

It is known that these cables are subjected to vibrations because of the wind or the circulation of vehicles, particularly heavy vehicles, on the bridges equipped with said cables.

To damp such vibrations, devices have already been proposed comprising:

a collar surrounding a section of the cable at a few meters from the end, of this cable, which is anchored in an appropriate foundation, and two inclined struts incorporating vibration dampers interposed between their ends, each assembly formed by a strut and the associated damper connecting the collar to an anchorage block embedded in an appropriate foundation.

In known embodiments of the devices considered, the dampers are of the type equipping heavy vehicles, i.e. relatively expensive and space-consuming.

For the same purpose of damping the vibrations of stay cables, it has already been proposed to surround the lower end of such a cable, anchored in a foundation, with clearance by means of a cylindrical box itself anchored at its base to said foundation, the annular gap between the section and the box being closed at its upper end by a deformable sealed bellows and this gap being filled with grease.

When the cable section considered is subjected to transverse vibrations, it makes its hole in the mass of grease which surrounds it while deforming the end bellows and experience shows that the resultant damping leaves much to be desired.

The object of the invention is especially to provide, for cable vibration damping devices, a much better adapted construction which is at one and the same time particularly efficient, aesthetic and economic.

For this, the cable vibration dampers of the invention, anchored at one at least of their ends in a foundation, are essentially characterized in that they comprise a first rigid annular member surrounding a section of the cable disposed in the vicinity of the foundation, and fast with said section, a second rigid annular member mounted on the first one with formation therebetween of an annular cavity so as to be able to move transversely with respect to this first annular member, seals which are practically indeformable interposed between the two annular members so as to seal the annular cavity with respect to the outside, a cushion made from a flowable material, but of constant overall volume, filling the annular cavity, and a rigid structure connecting the second annular member to a foundation.

In advantageous embodiments, recourse is further had to one and/or other of the following arrangements:

the first annular member is a gutter having in axial half section a radially outwardly open U shape with transverse wings and the second annular member is an annulus housed in the groove of this gutter with interpositioning of sliding seals, each of the annular members is formed of two-semicircular halves assembled together with possible interpositioning of appropriate seals, the seals comprise annular shoes housed in grooves themselves formed in the transverse faces of the annulus, these shoes being applied axially against the inner faces of the facing transverse wings of the gutter, then flat and preferably polished, in a damper according to the preceding two paragraphs, the annulus is formed of two coaxial annular elements surrounding each other and formed so as to provide the lateral grooves therebetween, each groove having an external portion which receives, with radial play, a shoe and an internal portion radially narrower than the external portion and equipped with an elastomer material ring which is crushed radially between the two annular elements following clamping providing mutual fixing of the two halves forming the external annular element, such radial crushing of the ring resulting in its axial expansion which applies the shoes against the facing faces of the gutter, in a damper according to the paragraph preceding the preceding one, the annulus has, in axial half section, the shape of a radially inwardly open U with transverse wings, the bottoms of the grooves are formed with axial holes which connect these grooves to the inside of the annulus and the shoes are applied against the facing faces of the gutter by the internal pressure of the material forming the cushion, via successively an internal metal washer housed radially with play in the corresponding groove and an elastomer ring crushed radially in this groove, the annular cavity formed between the gutter and the annulus has at least one restricted passage for hindering the flow of material forming the cushion.

Apart from these main arrangements, the invention comprises certain other arrangements which are preferably used at the same time and which will be more explicitly discussed hereafter.

In what follows, a few preferred embodiments of the invention will be described with reference to the accompanying drawings in a way which is of course in no wise limitative.

FIG. 1, of these drawings, shows schematically a side view of a cable vibration damper in accordance with the invention mounted on the corresponding cable;

Figure 1:
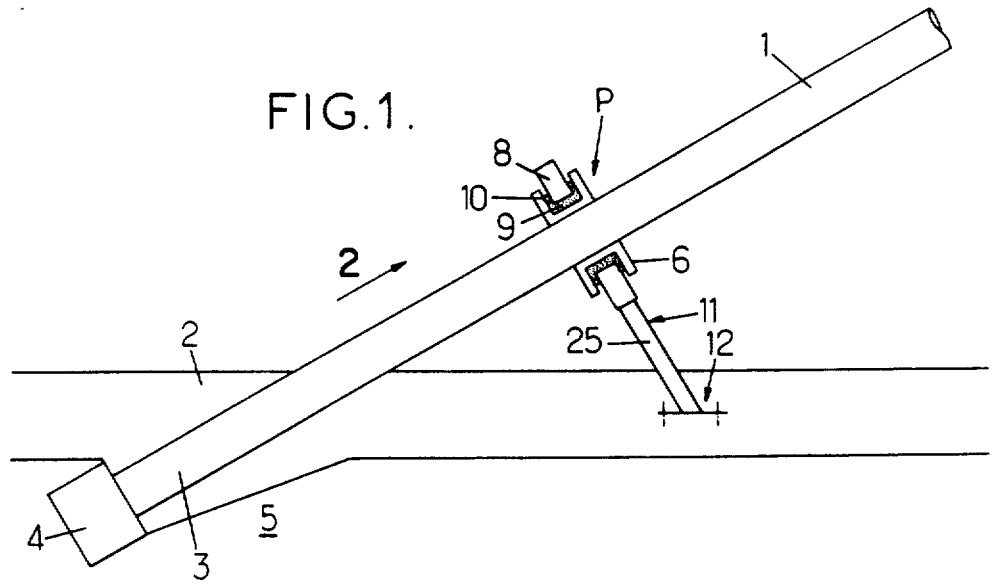

It is proposed here to damp the transverse vibrations to which the stay cables 1 of a bridge 2 are subjected because of the wind or the circulation of vehicles over this bridge.

If, in fact, such cables are not controlled, they may cause damage, in particular at the level of the connections of each cable with the suspending rods of the deck of the bridge and especially at the level of the anchorage points of the cable, particularly if the vibrations considered cause a resonance phenomenon.

To damp such vibrations, a damping load is imposed locally on each cable considered, in at least one position P, of this cable, disposed at a few meters from its lower anchored end 3.

This lower end is anchored in any desirable way to a block 4 which is fast with an appropriate foundation 5 such as the ground or the framework itself of bridge 2.

For this, the section of cable 1 situated at P is surround by an annular gutter 6 fastened to this section, i.e. by a collar having in axial half section the form of a radially outwardly open U, an annulus 8 movable transversely with respect to said gutter is housed in groove 7 of this gutter, with interpositioning of an annular cavity filled by means of a cushion 9 made from a flowable material, but of constant overall volume, sealing with respect to this material being provided by seals 10 which are practically indeformable, at least at their portions in contact with the cushion 9, and the annulus 8 is connected by a rigid structure 11 to an anchorage block 12 fast, like block 4, with an appropriate foundation such as the ground or the framework itself of the bridge.

The material M forming cushion 9 is a viscous liquid or an elastic or plastic paste such as a silicon gum or else a grease capable of flowing under load without modifying its overall volume.

Because of the rigid connection formed between annulus 8 and the foundation, this annulus 8 may be considered as being fixed in space.

If cable 1 is subjected to transverse vibrations, the same goes for gutter 6 which is fast with it at P and this gutter is therefore caused to move transversely with respect to the fixed annulus 8, which it straddles.

Considering that the portions of seals 10 in contact with cushion 9 are practically indeformable, the movements of the gutter result in driving circumferentially backwards a portion of the paste forming cushion 9, disposed in a given sector of the annular cavity provided between the gutter and the annulus, towards the diametrically opposite sector of said cavity and inversely at the rhythm of the vibrations to be damped.

Such alternate driving back absorbs a considerable amount of energy, which damps the vibrations considered very efficiently.

To fit the annular members 6 and 8 on cable 1, it is not possible to fit them over the end like beads, since the ends of the cable are not accessible for this purpose.

This drawback is overcome by forming each of the annular components of the damper by two semi-circular halves applied one against the other and secured together if need be, particularly by screwing at the level of radial flanges juxtaposed along axial flat portions with interpositioning of appropriate seals, for the metal parts, or by bonding along flat bevelled surfaces for the seals.

Figure 3:
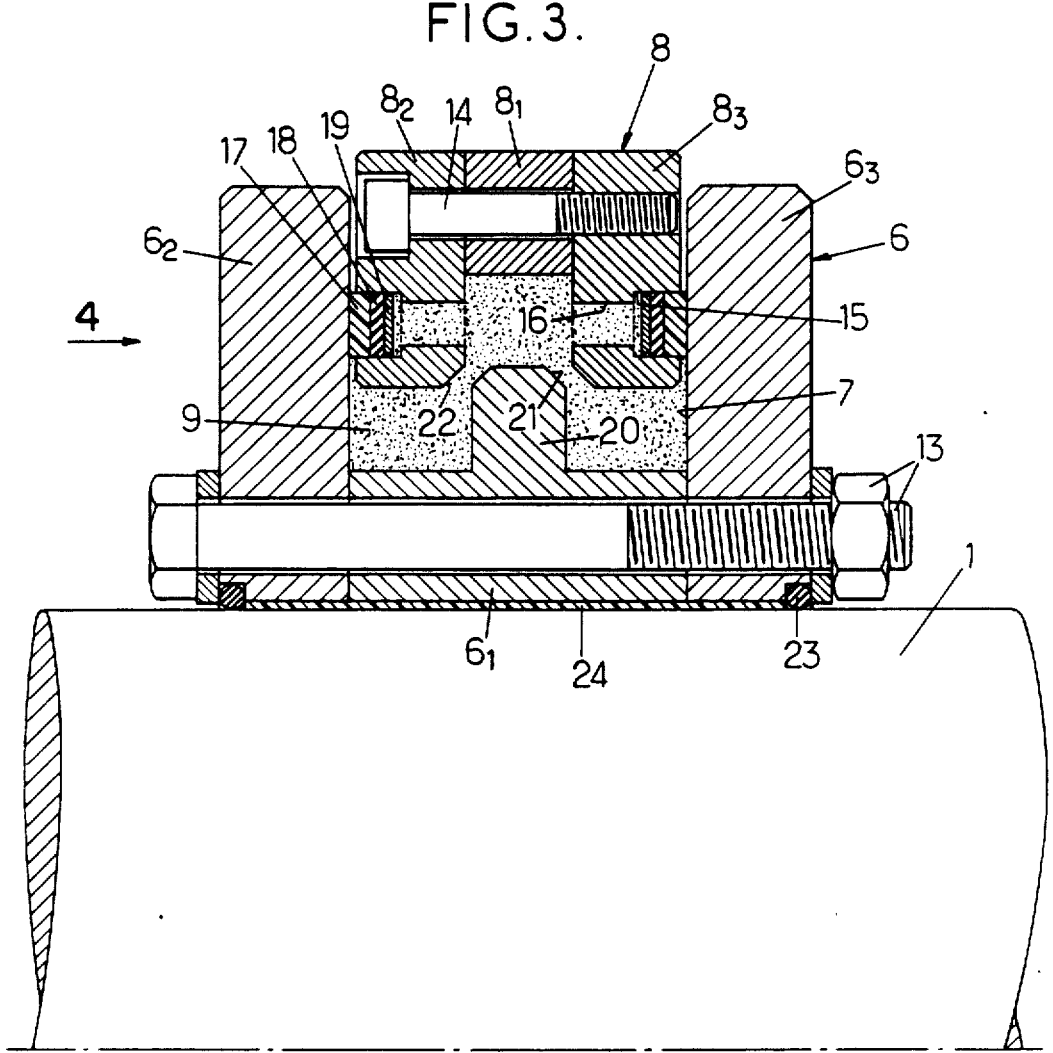
FIG. 3 shows in axial half section a portion of such a damper.
Figure 4:
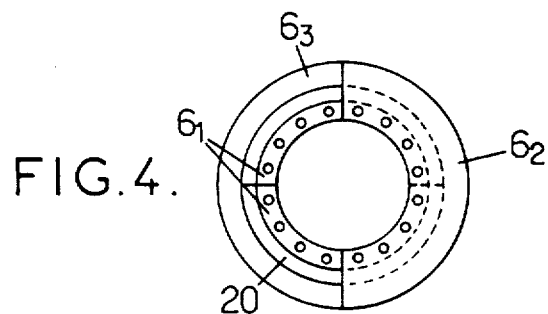
FIG. 4 is an end view along arrow IV of FIG.-3 and on a reduced scale of one of the annular members forming such a damper.

In a first embodiment, illustrated in FIGS. 3 and 4, each of the annular members 6 and 8 is formed by six elements, FIG. 4 showing an end view of the gutter 6 alone with one of its left-hand components removed.

More precisely, each of the two annular members 6 and 8 is formed of three parts, namely an intermediate ring $6_1$, $8_1$ surrounded axially by two disks $6_2$, $6_3$; $8_2$, $8_3$, the three parts of each element being assembled together by screwing means 13, 14 which pass therethrough axially from one side to the other.

Furthermore:

each part is formed, as mentioned above, of two halves juxtaposed along an axial plane, and the juxtapositioning planes corresponding to the axially adjacent parts are offset angularly about the common axis, preferable by 90°.

Of course, appropriate seals (not shown) are provided for sealing with respect to material M forming cushion 9 at the level of the mutually juxtaposed surfaces of the halves of the different parts considered.

The three part construction which has just been described further confers on the axial half section of annulus 8 the general form of a radially inwardly open U.

The external face of the two wings of this U, formed by the two disks $8_2$ and $8_3$, are formed with annular cylindrical grooves 15 whose bottoms communicate with the inside of the U through axial holes 16.

Grooves 15 are occupied by annular sealing shoes themselves formed of three axially superimposed washers, namely:

a practically indeformable external washer 17, made more particularly from polytetrafluroethylene, an intermediate washer 18 made from an elastomer such as a vulcanized silicon rubber, and an inner metal washer 19, The first two washers 17 and 18 are housed jointingly in groove 15 whereas a small clearance is left between the cylindrical faces of this groove 15 and the metal washer 19.

The internal faces of the two disks $6_2$ and $6_3$ forming the wings of gutter 6 are flat, parallel with each other and treated so as to be hard and smooth, being formed more particularly by a chromium-plated polished coating or by an added stainless steel foil.

Material M forming cushion 9 is here injected under pressure into the annular cavity formed between the gutter and the annulus.

Considering this pressure, said material M applies the annular shoes firmly against the facing faces of the wings of the gutter.

Such application results in providing excellent and durable sealing with respects to material M between the annular cavity and the outside.

It should be noted in this connection that said application results in each washer 18 being crushed axially by the adjacent metal washer 19, which expands these washers 18 axially and applies them against the cylindrical facing faces of grooves 15 which contain them.

To increase the coefficient of friction due to sliding of the shoes against the facing faces and thus increase the desired damping of the vibrations of the cable, it may be advantageous to replace the PTFE-polished metal pair by another pair such as bronze-bronze.

To further improve the damping considered, restrictions may be created inside the annular cavity containing cushion 9, in this paths likely to be followed by material M forming this cushion during flowing thereof due to the vibrations.

Such restrictions are created for example by providing, about the median portion of ring $6_1$, a collar 20 which projects radially in the direction of the U shaped annulus 8: the edges of this collar 20 are advantageously chamfered at 21 as well as the adjacent edges of disks $8_2$ and $8_3$ at 22, so as to define restricted truncated cone shaped passages between these chamfered zones.

To fix the gutter 6 firmly on the cable section 1 which it surrounds with a very small clearance, the corresponding annular space 24 of very small thickness is defined axially by two O-seals 23 and into this space is injected a hardenable product capable of adhering not only to the collar but also to the cable.

Figure 5:
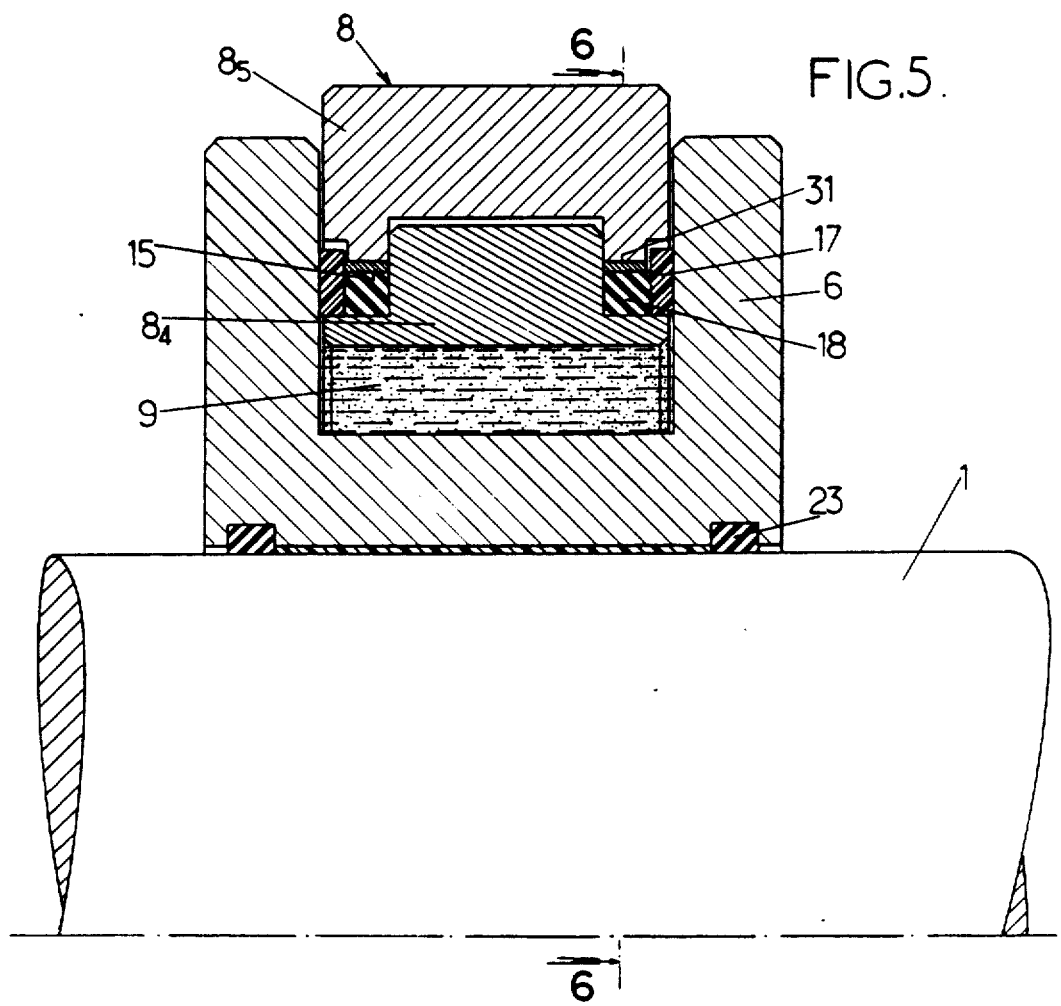
FIGS. 5 and 6 shows, respectively in axial half section through V—V of FIG. 6 and in semi cross section through VI—VI of FIG. 5, a damper variant also in accordance with the invention.
Figure 6:
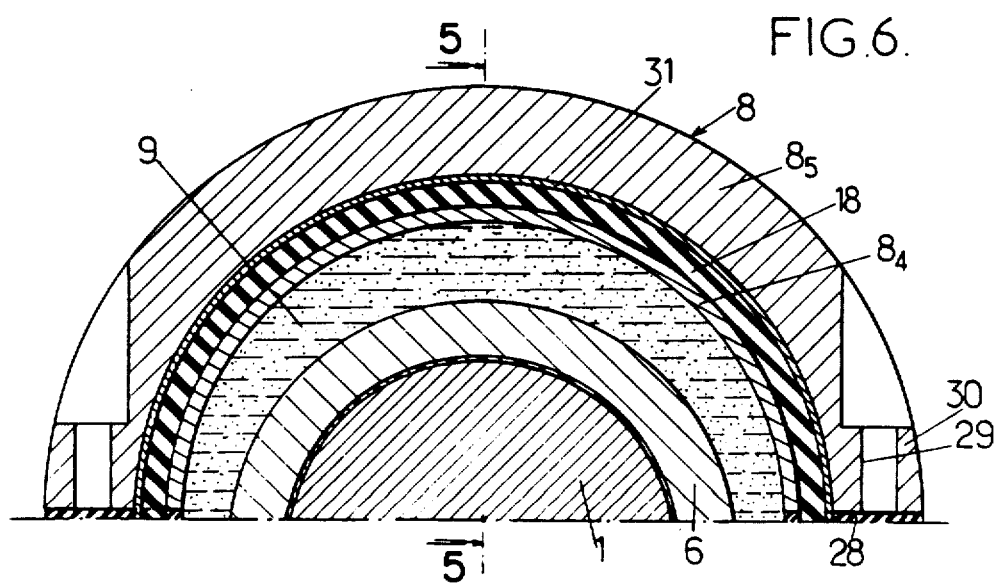

The second embodiment illustrated in FIGS. 5 and 6 is simpler than the one shown in FIGS. 3 and 4.

Each of the two semi-circular halves forming the annular gutter 6 is here formed as a single block.

As for annulus 8, each of its two semi-circular halves is here formed of two coaxial elements, namely a first inner element $8_4$ and a second outer element $8_5$ enveloping the first one.

The first element $8_4$ is in the form of a title semi-cylindrcial in revolution in the middle of which there outwardly projects a wide semi-circular rib of rectangular section.

The second element $8_5$ is in the form of an inwardly open semi-circular channel jointingly covering the rib of the first element.

The profiles of the two elements are chosen so that, after the second one has been positioned on the first, annular grooves 15 are formed therebetween in the transverse faces of the annulus formed.

Each groove comprises:

an external portion covering with clearance an annular polytetrafluoroethylene seal 17, and a radially inner portion narrower than the preceding one, in which an elastomer material ring 18 is housed without play.

This ring 18 is crushed radially during fitting, by the external half elements $8_5$ which bear thereon when they are clamped together, with interpositioning of appropraie seals 28 (FIG. 6) so as to form example provided by bolts (not shown) housed in smooth and threaded holes 29 provided respectively in radial flanges 30 of said elements $8_5$.

The pressure of such clamping may be applied directly by elements $8_5$ against the rings 18.

But it may also be applied on these rings by means of metal spacer hoops 31 playing a role similar to the metal washers 19 of the preceding embodiment.

Radial crushing of the elastomer material rings 18 results in the axial expansion thereof and the latter in its turn results in applying seals 17 axially very firmly against the flat transverse walls opposite gutter 6.

Figure 2:
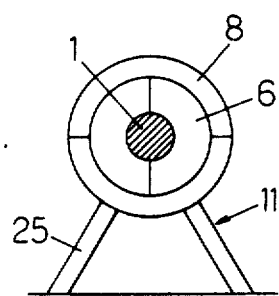
FIG. 2 is a side view along the arrow II of FIG. 1.

In the embodiment shown schematically in FIGS. 1 and 2, the rigid structure 11 which supports annulus 8 is formed by two struts 25 inclined with respect to the vertical and symmetrical with each other with respect to the vertical plane passing through the axis of the cable section 1 at this position, the mean line of each strut being situated in the plane perpendicular to said axis at said portion.

Figure 7:
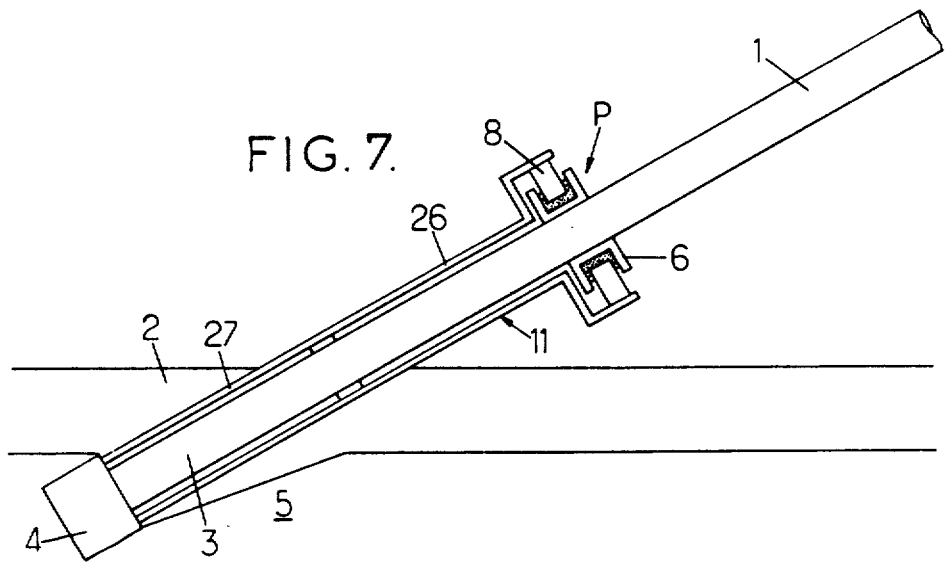
FIG. 7 is a variant of FIG. 1 still in accordance with the invention.

In the embodiment shown schematically in FIG. 7, the rigid structure 11 is formed by an extension 26 of the guide tube 27 sometimes provided for surrounding the anchored end 3 of cable 1, which end may be buried or at least embedded, over a small distance, in an appropriate solid block.

Following which and whatever the embodiment adopted, a cable vibration damping device is finally obtained whose construction and operation are sufficiently clear from the foregoing.

This device has a number of advantages with respect to those known before and in particular those of efficiency, long life, resistance to heating, aesthetic and low cost price.

As is evident, and as it follows moreover from what has gone before, the invention is in no wise limited to those of its modes of application and embodiments which have been more especially considered; it embraces, on the contrary, all variants thereof, particularly:

those in which a plurality of damping devices of the kind described above are mounted at several spearate points of cable 1, and those in which the respective constructions of the two annular elements would be reversed with regard to the above, illustrated, embodiments, the annular gutter being then inwardly opened, arranged on the outside and rendered fixed through the rigid structure, while the ring overlapped by said gutter would be on the inside and firmly joined with the stay cable.

I claim:

1. Device for damping the vibrations of a stay cable (1) anchored at at least one of its ends in a foundation (5), comprising a first rigid annular member (6) surrounding a section of the cable disposed in the vicinity of said foundation and fast with said section, a second annular member (8) mounted on the first annular member with formation therebetween of an annular cavity (7) so as to be able to move transversely with respect to the first annular member, seals (17) which are practically indeformable interposed between the two annular members so as to seal the annular cavity with respect to the outside, a cushion (9) made from a flowable material, but of constant overall volume, filling the annular cavity, a foundation (12), a rigid structure (11) connecting the second annular member to the foundation (12), the first annular member (6) being comprised of a gutter having in axial half section a radially outwardly open U shape with transverse wings having inner faces, the second annular member (8) being comprised of an annulus having transverse faces housed in the opening of the gutter, grooves (15) formed in the transverse faces of the annulus of the second annular member (8), said seals (17) being interposed between the gutter and the annulus of the second annular member (8), the seals being comprised of annular shoes (17) housed in said grooves (15) formed in the transverse faces of the annulus (8), the shoes being applied axially against the inner faces of the facing transverse wings of the gutter (6), which said inner faces are flat and preferably polished.

2. Device for damping according to claim 1 wherein the annulus (8) is formed of two coaxial annular elements surrounding each other and formed so as to provide said grooves (15) therebetween, each groove having an external portion which receives, with radial play, one of said shoes (17) and an internal portion radially narrower than the external portion, an elastomer material ring (18) received in the internal portion of each groove which is crushed radially therein between the two annular elements to force the shoes (17) against the gutter (6).

3. Device for damping according to claim 1 wherein the annulus (8) has, in axial half section, the shape of a radially inwardly open U with transverse wings, the bottoms of the grooves (15) are formed with axial holes (15) which connect the grooves to the inside of the annulus and the material forming the cushion (9) is under an internal pressure sufficient to urge the shoes (17) via a metal washer (19) and elastomer ring (18) housed in the grooves against the inner faces of the gutter (6).

4. Device for damping according to claim 1, wherein the annular cavity (7) formed between the gutter (6) and the annulus (8) has at least one restricted passage for hindering the flow of material forming the cushion (9).

5. Device for damping according to claim 1, wherein the gutter (6) includes a collar (20) projecting radially from the bottom of its opening, in the middle of the axial dimension thereof, said collar defining with the annulus (8) two restricted annular passages.

* * * * *